United States Patent [19]

Bertero

[11] 4,383,374

[45] May 17, 1983

[54] DEVICE TO DETERMINE HAIR CUTTING ANGLE

[76] Inventor: Anthony J. Bertero, 2434 Shade Tree La., Tucson, Ariz. 85715

[21] Appl. No.: 222,575

[22] Filed: Jan. 5, 1981

[51] Int. Cl.³ .............................................. G01C 9/12
[52] U.S. Cl. ....................................................... 33/373
[58] Field of Search .................................. 33/370–373, 33/334

[56] References Cited

U.S. PATENT DOCUMENTS

| | | |
|---|---|---|
| 390,115 | 9/1888 | Delany .............................. 33/373 X |
| 1,401,146 | 12/1921 | Falconer ........................... 33/373 X |
| 1,853,828 | 4/1932 | Mami . |
| 2,138,640 | 11/1938 | Levy . |
| 2,199,282 | 4/1940 | Condron . |
| 2,727,522 | 12/1955 | Gomme . |
| 2,821,203 | 1/1958 | Kesterson . |
| 2,879,778 | 3/1959 | Peck . |
| 3,188,748 | 6/1965 | Moody ................................. 33/373 |
| 3,885,306 | 5/1975 | Herman ............................. 33/372 X |
| 3,978,591 | 9/1976 | Jaaskelainen ..................... 33/373 X |
| 4,158,259 | 6/1979 | Hansen et al. ..................... 33/370 X |

Primary Examiner—Charles E. Phillips
Attorney, Agent, or Firm—J. Michael McClanahan

[57] ABSTRACT

A device to be worn upon the index finger to determine hair cutting angle comprising a ring mount for circling the index finger, a circular disk-like case attached to the ring mount, a face dial attached to the case circular surface inscribed with lines eminating radially from the center of the circular dial indicative of degrees of a circle, a weighted pointer pivotally attached at the center of the dial, and a lens covering the dial face and weighted pointer. The hair stylist wears the subject device upon the index finger of the hand not holding the scissors for cutting hair, takes a section of hair between the index finger about which the device resides and the middle finger, spreading the hair linearly along the fingers. The angle of inclination of the finger is adjusted until a desired angle between the weighted pointer and a scribed radial mark is obtained.

The operator then cuts the section of hair at the point along the top of the fingers. Picking up an adjacent section of hair, the same technique is employed to assure that adjacent sections have either an identical or slightly different hair cutting angle as called for. The method is continued throughout the head resulting in the hair stylist reducing the art of cutting the hair to a point where the hair cutting angle is either pre-determined or determined as desired.

2 Claims, 5 Drawing Figures

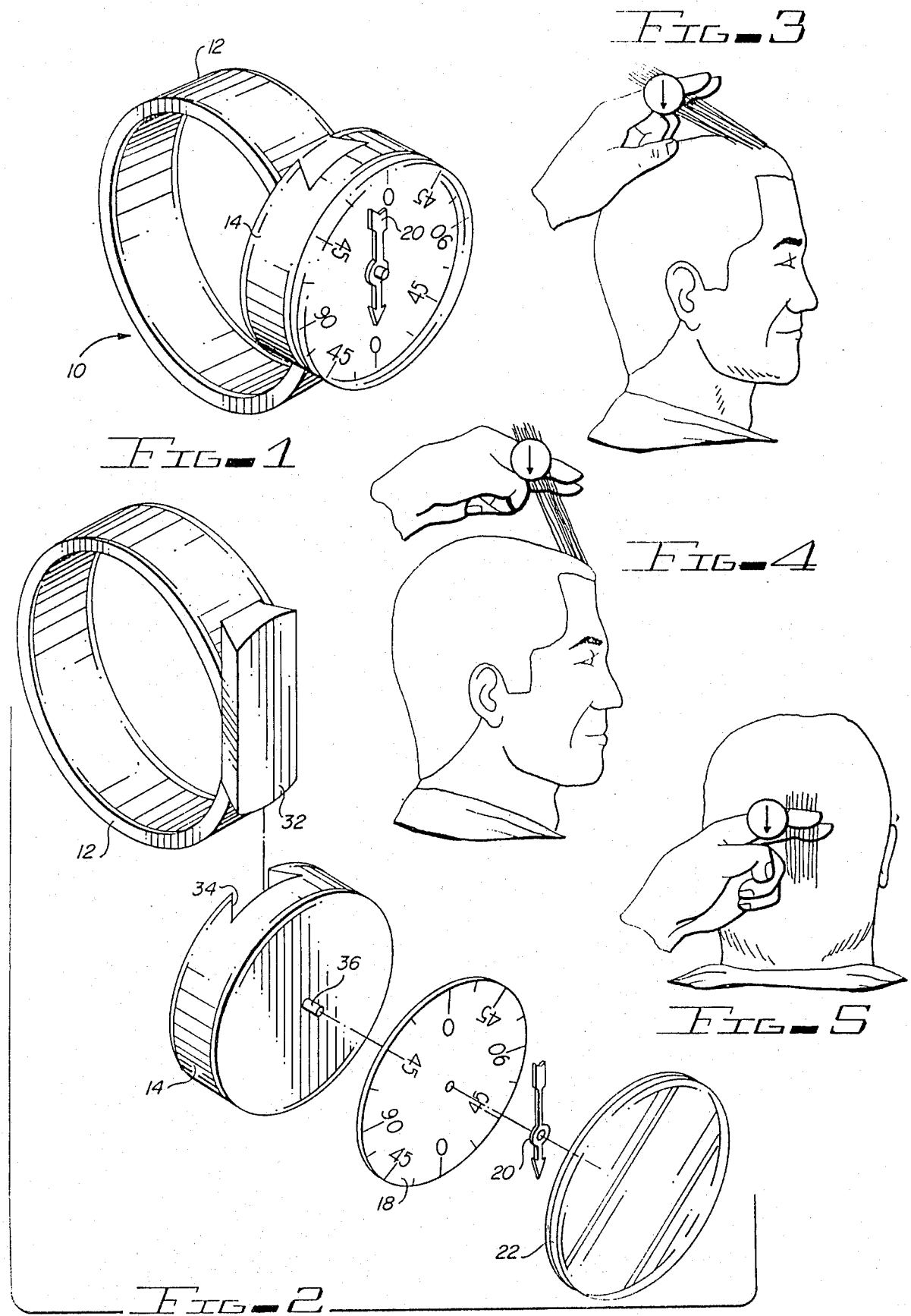

DEVICE TO DETERMINE HAIR CUTTING ANGLE

BACKGROUND OF THE INVENTION

The present invention relates to the class of hair cutting aids, and in particular, determining hair cutting angle.

As one might imagine, part of the skill of cutting hair by a barber or hair stylist in the heretofore known techniques comprises taking small areas or groups of hair a slight distance away from a person's scalp and cutting that section of hair such that when the hair goes back into place or is combed in place, the ends of the hair all join to form a rounded pattern surrounding the head, or any other pattern that the hair stylist is attempting to create. Cutting a section of hair too short, or cutting the section of hair at an angle different from the angle of hair cut in its proximity causes that particular section to become noticeable and to distract from the quality of the haircut.

Now there have been aids to assist the haircutter in cutting hair a fixed distance away from the head, for example, Gomme in U.S. Pat. No. 2,727,522 illustrates such a device. Here a distance measuring reference is attached to a finger guide such that when hair is graspsed and the distance measuring guide urged against the scalp, the hair may be cut at a certain known distance away from the scalp.

Various articles have been written concerning the science of hair cutting, for example, *The Thinking Haircutter* by Robert King is a book discussing different techniques for cutting hair in different areas of the scalp. In one technique, the scalp is divided into a plurality of pie shaped sections extending radially from the top of the occipital bone of a person's head in order to illustrate the importance of keeping the correct angle of inclination of the cut hair constantly maintained. Cutting the hair at the correct angle at the different points of the scalp to achieve layer cuts and a resultant desired hair style may only be achieved by monitoring each angle of inclination of cut hair.

Heretofore, the barber of hair stylist achieved such cutting angles by taking the section of hair along the gap between his index and middle finger, adjusting the angle of his index and middle finger in accordance with some angle already pre-set in his mind, and then cutting along the top of the index finger-middle finger junction with a pair of scissors. That section of hair was then allowed to go back to the head and an adjacent section of hair was then picked up, and the process repeated. The operator worked around the head, mentally measuring and adjusting each angle of inclination of the fingers for cutting each section of hair.

All adjustments which need be made in the angle of inclination of the fingers where the scissor cuts are made become a mental process, the operator having to first guess at what angle he wishes to cut each particular section of hair, and attempt to duplicate it with the next section and to modity that angle as he proceeds along.

It is readily apparent that an operator, firstly relying upon his mental abilities to fix the angle of the cut, and then continuing to rely on his mental abilities to accordingly adjust the cut, is severely taxed and only through long experience will become the successful barber or hair stylist.

It is apparent then that there is a need for a device by which the angle of inclination of the cut hair may be selected and known, as well as a method by which changes in known angles of inclination of cut hair may be made at a known rate. It is to this need the present invention is directed.

SUMMARY OF THE INVENTION

The present invention comprises a finger worn device by which a hair stylist or barber can select the angle at which the person's hair is to be cut. More specifically, to a ring mount which fits on an operator's index finger on the hand not used for holding the scissors or shears, is attached a circular disk having a plurality of radially scribed lines eminating from its center and at which center is pivotally mounted a gravity responding weighted pointer which, when the plane of the circular face of the disk is vertical, causes the pointer to always point to the ground (center of the earth). This ring is easily slidable annularly around the operator's finger so it may be manually adjusted to always present a free and unobstructed view to the operator.

As the operator takes and spreads a section of hair between his index and middle finger of the hand wearing the invention, the operator observes the marking upon the face of the dial relative to the weighted pointer pointing down and adjusts the angle of inclination of his index and middle finger to the desired angle. He then cuts along the top of his index and middle finger. A next section of hair located horizontally or vertically next to the section immediately cut is taken, the angle of the cut adjusted to the same as the prior angle, or slightly different as desired, and the cut made. The operator then proceeds around the head adjusting the cut to achieve the angle of inclination of the hair cut as desired.

Accordingly, it is an object of the subject invention to provide a device by which the angle of inclination of hair to be cut may be determined.

Further, it is an additional object of the subject invention to provide a device by which the angle of inclination of hair to be cut can be indicated.

This object and other objects will become apparent to the reader in the following discussion.

BRIEF DESCRIPTION OF THE DRAWINGS

FIG. 1 is a perspective view of the subject invention.

FIG. 2 is a perspective view of the invention in a disassembled mode.

FIG. 3 is a side view of a person having the hair from the head crown area cut by an operator utilizing the subject invention.

FIG. 4 is a side view of a person having the front area hair cut by an operator utilizing the subject invention.

FIG. 5 is a back view of a person having the head back area hair cut by an operator utilizing the subject invention.

DETAILED DESCRIPTION OF THE PREFERRED EMBODIMENT

Referring now to FIG. 1, the subject inventive device which a hair stylist wears on their index finger to determine hair cutting angle 10 is shown. Firstly, the portion which engages and surrounds the index finger, namely the ring mount 12 is shown as a rather side annular hand adapted to be slipped over the stylist's finger. Mounted upon the ring is the instrument which illustrates the angle the hair is cut, namely the angle indicating assembly case 14 which comprises in shape a circular disk, the angle indicating face, dial 18 and the weighted needle pointer 20. As can be seen in FIG. 1, the weighted pointer needle points downward, as influenced by gravity, pointing to "0". The angle indicating face 18 is scribed with, in the preferred embodiment, sixteen equally spaced marks, each mark eminating radially outward from the center. These marks, as illustrated in FIG. 1, have been variously identified with the number of degrees which the mark bears relative to the zero scribed mark so that with "0" indication as the vertical marks, both horizontal marks indicate an angle of 90°. Bisecting at four points the angle between the two "0" and "90" marks are the "45" degree marks with an additional dividing mark half way between each of the "0°", "45°", and "90°" markings.

As the hair stylist moves his hand around with the subject invention attached to his index finger, whenever the plane of dial 18 is vertical, weighted pointer needle 20 will seek the ground by influence of gravity, and the dial 18 of the ring will indicate a degree reference, depending upon the relative angle of inclination of the index finger.

Not shown in the perspective view of FIG. 1 is the clear transparent lens which covers the angle indicating face 18 and which serves to protect the weighted pointer needle 20 and the angle indicating face from dirt, or other matters which in one way or another may tend to interfere with the movement of the pointer. However, in FIG. 2, an exploded perspective view of the device, the transparent lens is detailed along with the remainder of the invention.

Referring now to FIG. 2, and completing the description of the invention, ring mount 12 comprises an annular band having attached at one portion on its periphery, a triangular cross-sectioned tongue 32, which tongue is attached at one of its apexes. The tongue may be attached by an appropriate adhesive or, if the ring mount is formed from a durable material, such as plastic, the tongue 32 may be moulded simultaneously with the annular band.

Connecting with the ring mount 12 is case 14 which comprises substantially a rounded disk with two parallel circular sides and having a groove 34 fashioned through the periphery of the disk from one side to the other. As may well be expected, the cross-sectional shape of the groove 34 is so sized to nest snuggly around the triangular shaped tongue 32 such that the case 14 may be slipped on and off the triangle shaped tongue 32, but where there is sufficient friction that the case 14, once set upon the triangular shaped tongue 32, will resist movement from touching and handling. Centrally located to the circular face of case 14 is a short protruding axis 36 which, as will be explained later, aligns dial 18, and provides a means upon which the weighted pointer 20 pivots.

Continuing on, the angle indicating dial 18 is shown in position to be placed upon the top circular surface of case 14, dial 18 generally being attached to case 14 by an appropriate adhesive. As stated in the description of FIG. 1, the face of dial 18 has been inscribed with various angle indicating marks, all eminating radially from the center. As is seen, dial 18 has a small opening at its center through which axle 36 extends when dial 18 is placed in the case 14 circular surface.

Weighted pointer 20, which is weighted in its arrow point end, is installed upon axle 36 by means of a small opening, slightly larger than axle 36, which has been formed centrally in pointer 20.

Finishing up construction of the subject invention, lens 22 finally covers pointer 20 and dial 18 to attach to, at its outer periphery, case 14. Lens 22 is made of a clear, transparent material, such as clear plastic. In fact, it has been found beneficial to make all parts of the invention of a durable plastic, perhaps with the lone exception of the pointer 20. A very thin pointer is shown in FIG. 2, however it need not be this configuration—most any configuration, generally elongated, which is weighted at one end and pivotable at the other may be utilized.

In practice, the subject invention is utilized as shown in the figures remaining. Referring now to FIG. 3, a side view of a hair stylist cutting the head crown area hair is illustrated. Shown here, the hair stylist wears the subject invention on his left index finger where the dial is readily visible, and takes the section of hair between the left index finger and the left middle finger. The hair is spread along the opening between the two fingers in a substantially even distribution. The needle, always pointing down, will read some value on the dial face. The operator will vary the angle of inclination of his fingers until a desired angle is achieved. For example, in FIG. 3, the desired reading may be upon the 45° mark. The scissors then is laid across the top of the index finger-middle finger junction and the cut is taken. Then the hand is moved back, allowing the hair just cut to fall to the rear of the head and a new section of hair next to the section immediately cut, is taken between the index finger and the middle finger.

Once the second section of hair is taken, the fingers then are aligned at the same angle to the horizon (or vertical) such that the weighted needle intersects the same reading as before so that the hair then cut, will be cut at the same angle as the first section. Or a slightly different reading may be obtained and then the hair cut taken.

Referring now to FIG. 4, here is detailed cutting hair from the head front area where, like the technique illustrated in FIG. 3, the hair is placed between the left hand index finger and middle finger, the needle permitted to steady itself in a downward position, and the angle of inclination of the fingers adjusted until the desired angle is achieved. The hair is then cut by the pair of scissors laying along the top of the index finger-middle finger and the hair allowed to lay on the head. The next section is taken, the hand tilted until the same reading as before, or desired different reading, is observed on the dial and again the hair is cut.

Referring now to FIG. 5, an illustration is shown of the horizontal cut in cutting the head back area hair. Again the hair section is aligned between the index finger and the middle finger and the angle of the fingers adjusted until the needle pointing downward intersects the 0° on the dial face. The scissors then is placed upon the outside of the index finger-middle finger combination and the hair cut. Thereafter, immediately adjacent sections of hair are taken, all cuts made after observing that the needle intersects the 0° scribed line.

Many hair stylists cut the section of hair at the back head area by cutting under (but still next to) the index finger-middle finger junction. This may be easily accomplished by merely sliding upward the case 14 upon tongue 32 while still holding the hair to allow room for the scissors to make its cut.

It is noted in the FIGS. 3 through 5, that the hair is progressively cut from the front to the back so it becomes obvious that as these cuts are made, it is possible to continuously vary the angle of the hair cut in a known manner. This accomplishes the end result, that the hair, once it is smoothed against the head, will appear to be a continuous cut and pleasant appearing haircut front to back.

It is noted that as one proceeds on different areas of the head, because of the roundness of the head, it will be necessary to adjust the device around one's finger so that the dial face is always placed in a vertical plane, which is of course necessary in order for the weighted pointer to correctly operate and so that the face is observable to the operator. The movement of the ring on the finger is easily accomplished by mere rotation of the ring mount on the finger.

Cutting the hair on opposite sides of the head will require a slightly different technique inasmuch as the hair stylist will be working on the right and left sides. All this will entail, since it is assumed that the hair stylist is not ambidexterous such as to interchange cutting hands, is for the readings to be made on the dial face on either side of the head, to be in opposite directions from the referenced "0". As can be observed on the dial face, a complete 360° circle is not shown, but rather the dial face runs up to a maximum of 90° moving both clockwise and counter-clockwise from the 0° reference. Therefore, if on one side of the head a reading, for example, may be 45° in the clockwise direction from the "0" mark, it will be 45° in the counter-clockwise direction on the other side of the head.

It is obvious that while illustrations of the device are given for a right-handed operator, a left-handed operator may utilize the invention by wearing it on the right index finger. In both cases, and as shown in FIGS. 3–5, the index finger (or any other finger the ring mount may be placed on) is extended straight out, as well as the middle finger, so that the scissors cut is along a straight line.

Thus, with the subject invention, it is now possible for a hair stylist or barber to cut a person's hair where all of the different layer cuts will blend into each other and where the cuts on opposite sides of the head will match. It is obvious then that the practice of cutting the hair has been transformed from a procedure of estimating the angle in which a section of hair is cut to a procedure where the angle is known, and most importantly where the angle is controlled.

While the preferred embodiment of the device has been shown and described, it will be understood that there is no intent to limit the invention by such disclosure, but rather it is intended to cover all modifications and alternate constructions falling within the spirit and the scope of the invention as defined in the appended claims.

I claim:

1. A device to be worn on a finger of a hair stylist for determining hair cutting angle comprising an annular ring adapted to be worn upon the hair stylist's finger, said ring having an elongated tongue attached tangentially at its periphery in the plane of said ring; a case attached to said ring, said case having a first and second parallel flat circular surface and a rod protruding perpendicularily from the center of said first circular surface, and said second circular surface defining a groove formed into said circular surface adapted to receive said annular ring elongated tongue in sliding relationship; a dial attached to said case first circular surface; a gravity seeking weighted pointer pivotally attached to said case protruding rod; and a transparent lens attached to said case covering and protecting said dial and said pointer whereby the hair stylist may slidably adjust the position of the device upon a finger and slidably adjust said case with respect to said ring via said tongue and groove in order that a section of hair may be spread linearly between two adjacent straight extending fingers for cutting the hair parallel to the extended fingers, and the relative position of the weighted pointer pointing down and the dial is indicative of the angle the hair is cut.

2. The device for determining hair cutting angle as defined in claim 1 wherein said dial face has a parality of radially extending markings thereon, said markings indicative of various angles of a circle, whereby the relative position of the weighted pointer pointing down to the dial face markings is indicative of the angle the section of hair is cut.

* * * * *